Dec. 12, 1939.  C. N. MITCHELL  2,183,403
HYDRAULIC CLUTCH AND TRANSMISSION
Filed May 29, 1935   3 Sheets-Sheet 1
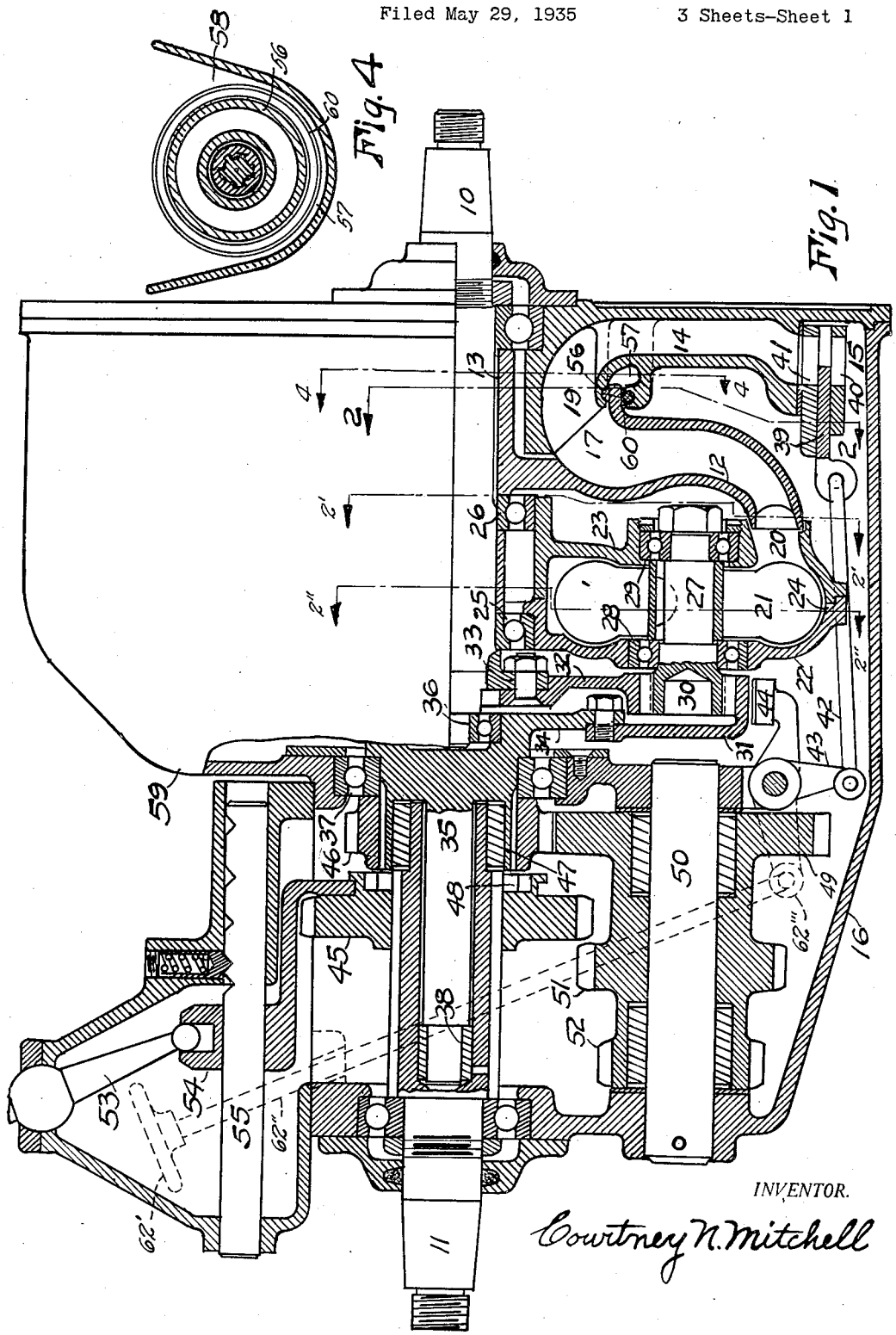
INVENTOR.
Courtney N. Mitchell Dec. 12, 1939. C. N. MITCHELL 2,183,403
HYDRAULIC CLUTCH AND TRANSMISSION
Filed May 29, 1935 3 Sheets-Sheet 2
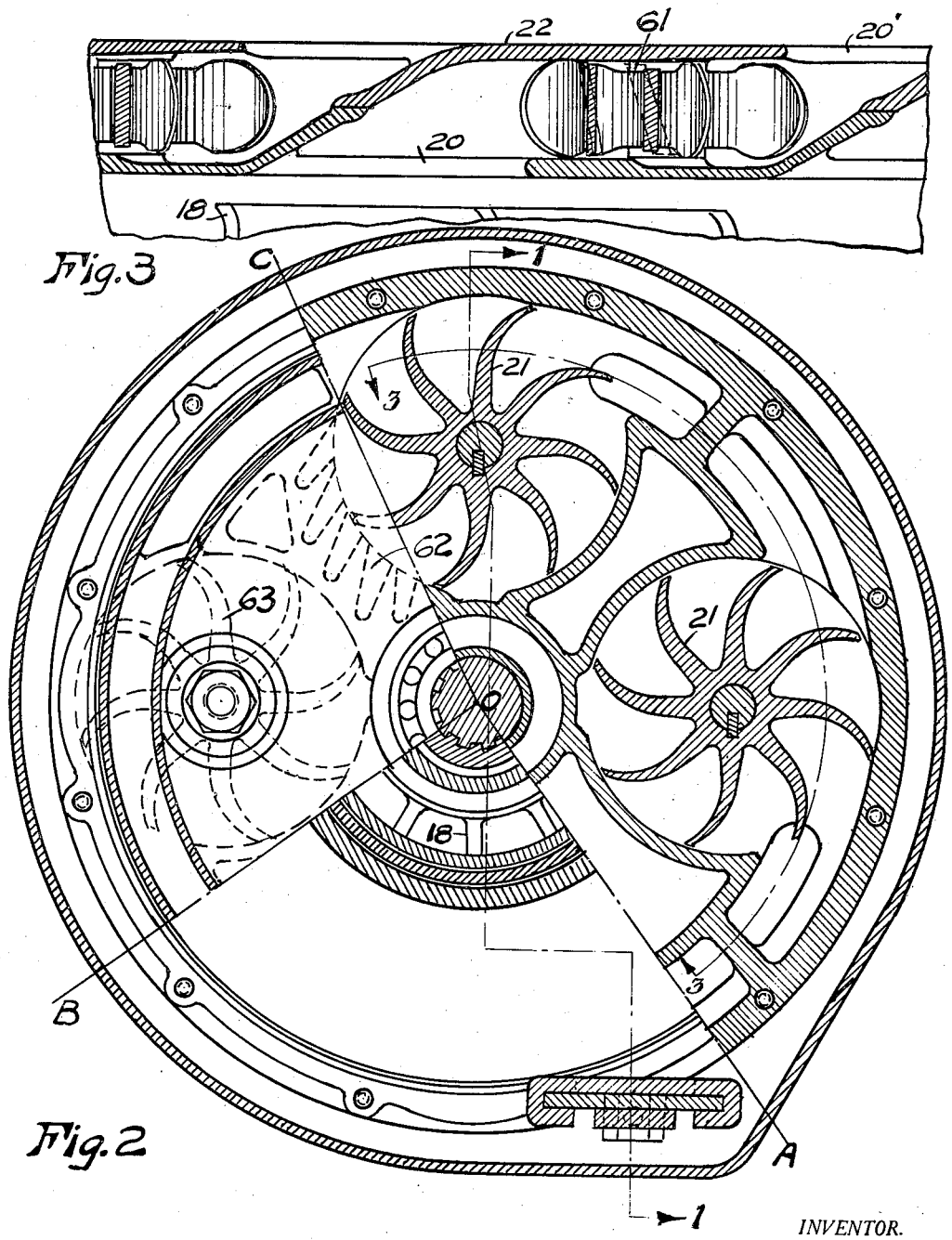
INVENTOR.
Courtney N. Mitchell

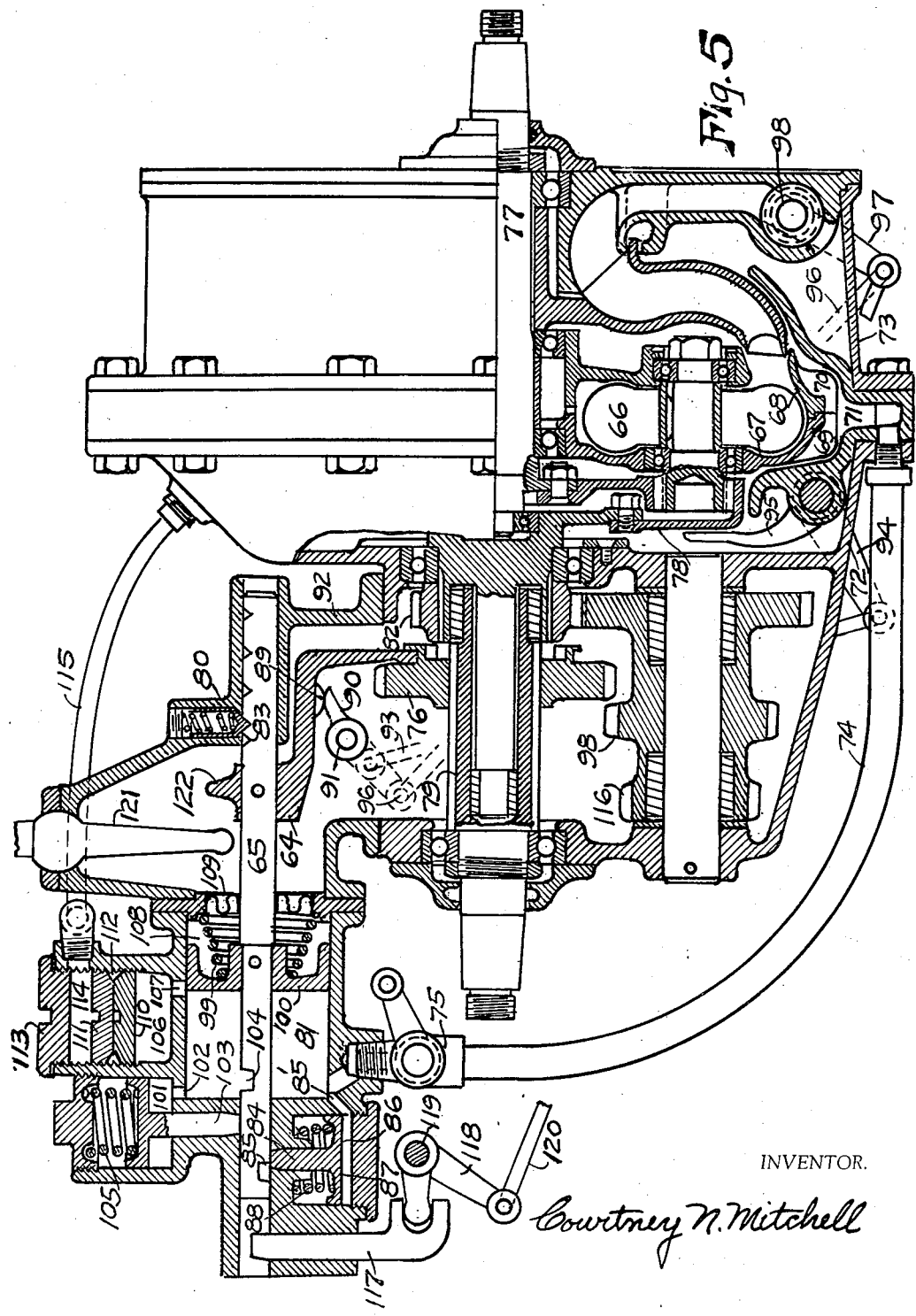

Patented Dec. 12, 1939

2,183,403

UNITED STATES PATENT OFFICE 2,183,403

HYDRAULIC CLUTCH AND TRANSMISSION

Courtney N. Mitchell, Strongsville, Ohio

Application May 29, 1935, Serial No. 23,980

27 Claims. (Cl. 74—328)

This invention relates, as indicated, to a hydraulic clutch and transmission and is directed primarily to an improved construction whereby the same unit serves not only as a means of connecting the source of power to the driven machinery, but provides for variations in the relative speeds of the source and the machinery. The construction is such as to permit the machinery to be driven efficiently either above or below the speed of the source within reasonable limits. For large differences of speed it is advisable to interpose an additional reduction by means of gears. For each gear ratio employed there will be a range of considerable magnitude in the continuously variable speeds both above and below the normal gear speeds.

In order to obtain continuously variable speeds with present hydraulic means, very high pressures are used as well as comparatively high liquid velocities, resulting in the dissipation of much heat and the resulting loss of power. To obtain quiet operation in present transmissions when the shifting of gears is required frequently, a very carefully constructed clutch is necessary as well as special means for bringing the gears to the same speed before moving them into mesh.

The chief object of this invention is to provide a clutch and transmission device which will require very little, if any, shifting of gears. Another object is to provide a clutch which will relieve both the driving and driven parts from sudden and severe shocks. Another object is to provide a device which will make the operation of the motor vehicle or other machine to which it is applied, more convenient. Another object is to provide a device which permits of controlling a motor car by means of the throttle only for various operating conditions. A further object is to provide a structure which will not only eliminate the free wheeling mechanism now usually employed, but will give driving torque when the propeller shaft is turning faster than the engine. A still further object is to provide a device of this character which is reasonable in manufacturing cost, easy to assemble into the structure in which it may be employed and of neat and compact appearance. An additional object is to provide an automatic means which may be interconnected with the hydraulic system for the changing of gear connections. To the accomplishment of the foregoing and related ends, said invention then consists of the means hereinafter fully described and particularly pointed out in the claims. The annexed drawings and following description set forth in detail certain mechanism embodying the invention, such disclosed means constituting, however, but a limited number of the various mechanical forms in which the principles of the invention may be used.

In said annexed drawings:

Fig. 1 is a longitudinal view partly in section on line 1—1 of Fig. 2 and partly in elevation showing the improved clutch and transmission. The upper part is shown in elevation as the interior structure of this part is substantially the same as the structure of the lower part. In Fig. 2 quadrant AOB is a partial section on line 2—2 of Fig. 1, quadrant BOC is a partial section on line 2'—2' of Fig. 1 and semi-circle COA is a partial section on line 2"—2" of Fig. 1. Fig. 3 is a section on the circular line 3—3 of Fig. 2. Fig. 4 is a partial section substantially on line 4—4 of Fig. 1. Fig. 5 is a view similar to Fig. 1 but showing automatic means for the engagement of the gears.

Referring now to Figs. 1, 2 and 3, the shaft 10 is the driving element connected to the engine or motor. Shaft 11 is the driven element connected to the propeller shaft or power take-off mechanism. Centrifugal pump impeller 12 is attached to shaft 10 by means of keys or splines as shown at 13. Riser 14 serves as a passage for the oil or other liquid employed in passing from the space 15 in the lower part of the housing or reservoir 16 to the inlet 17 of the impeller. The impeller 12 is provided with blades 18 as shown in Fig. 2 which are formed to receive the liquid from the stationary annular space indicated at 19 in Fig. 1. Impeller 12 discharges into the ports 20 of the rotating element carrying runners 21. This rotating element is formed of two halves 22 and 23 bolted together at 24 and is free to rotate on bearings 25 and 26. The runners 21 are keyed to the shafts 27 and are free to turn in bearings 28 and 29. At one end of shaft 27 is pinion 30 which meshes simultaneously with annular gear 31 and with spur gear 32. Spur gear 32 is bolted to flange 33 of shaft 10 and thus rotates with it. The annular gear 31 is bolted to the flange 34 of shaft 35. Shaft 10 is rotatably supported at its inner end on bearing 36 carried within flange 34. Shaft 35 is supported on ball bearings 37 and on roller bearing 38 carried within shaft 11. The flow of liquid from within the reservoir 16 to riser 14 is controlled by slide valve 39 operated between members 40 and 41. The rod 42 which controls valve 39 is connected to bell crank 43 which has braking surface 44 contacting with the outer surface of annular gear 31.

To take care of speeds beyond the efficient range of the hydraulic system, sliding gear 45 is mounted on the splines of shaft 11. Gear 46 which is keyed to shaft 35 at 47 is provided with lugs engaging jaws 48 of gear 45. Gear 49 of the cluster mounted on countershaft 50 meshes with gear 46 and the counter shaft gears are thus driven. Gear 51 is provided on the countershaft for low speed operation and gear 52 is provided for reverse. The various speeds are obtained by sliding the jaws of gear 45 into engagement with the lugs on gear 46 for high speed, by sliding the teeth of gear 45 into mesh with those of gear 51 for low speed, and by sliding them into mesh with the teeth of an idler, not shown, which meshes with gear 52, for reverse. The shifting operations are accomplished by lever 53 engaging shifter fork 54 mounted on rod 55.

In the operation of this clutch and transmission, the housing is filled to approximately the center of shafts 10 and 11 with oil. The engine or motor attached to shaft 10 is started and the oil flows through riser 14 into annulus 19 from where it is distributed to the blades 18 of the impeller driven by shaft 10. Impeller 12 being an efficient centrifugal pump, this liquid is delivered under conditions of considerable velocity and some pressure to the inlets 20 of the rotating element carrying runners 21. The liquid in entering at 20 comes in contact with runners 21 which obstruct its flow in passing across the rotating element and out through passages 20' of member 22 as shown in Fig. 3. The force of the liquid acting on the blades of runners 21 tends to rotate these runners in the direction of flow from 20 to 20'. The centrifugal force resulting from the rotation of the member carrying the runners holds the liquid in the outer part of the arcuate channels in this rotating member. By the rotation on their own axes of the runners 21 and shafts 27, the gears 30 integral with the shafts 27 rotate causing relative angular rotation of annular gear 31 and spur gear 32. Inasmuch as spur gear 32 rotates with shaft 10, any forward rotation of runners 21, due to hydraulic pressure acting on their blades, will cause gears 30 to rotate on their axes and annular gear 31 will thus rotate faster than spur gear 32 and a geared up condition will be attained.

If, due to heavy loads applied to shaft 35, annular gear 31 secured thereto moves more slowly than spur gear 32, the direction of rotation of runners 21 and gears 30 on their axes will be reversed and the velocity head of the liquid delivered into ports 20 will thus be converted into pressure acting on the blades of the runners producing a very effective torque on annular gear 31 and resulting in a geared down condition. Under normal operation the liquid pressure on the blades of runners 21 will be just sufficient to balance the torque on shafts 10 and 35 and no rotation of the shafts 27 on their own axes will take place and the only liquid delivered by the impeller 12 will be that necessary to replace the leakage past the runners. To reduce this leakage to a minimum, the blades of the runners are made to conform closely to the shape of the channel in the rotating member and the number of blades on each runner is sufficient to insure having at least one blade across the path from port 20 to 20'. To prevent leakage at the intake of the impeller a suitable packing seal is provided as indicated at 56. This insures priming under starting conditions and prevents leakage of air or other gases into the inlet side of the pump impeller at 17. If this packing becomes worn or is omitted, the reservoir 57 is provided in such form as to substantially surround the external space adjacent to this packing or to the space provided for it. This reservoir is filled and replenished during operation by the splash of the oil or other liquid employed collecting in the flared top as shown at 58 in Fig. 4. There being a large quantity of the liquid in the form of drops or streams suspended in the atmosphere in the upper part of the housing 59 and raining into the reservoir 57 or draining down the walls of the housing, this reservoir is kept sufficiently filled to serve as a liquid seal. The packing 60 is provided to impede the leakage from this sealing reservoir into the surrounding space.

As gears 30, 31 and 32 are usually provided with spirally cut teeth considerable end thrust often occurs in shafts 27 which is resisted by bearings 29. To reduce this thrust load the blades of the runners 21 may be formed at an angle with the axes of the runners as indicated at 61 in Fig. 3, the axial component of the hydraulic pressure being sufficient to balance approximately the axial thrust of the shaft.

In order to retard the rotation of the runners 21 in the reverse direction and thus provide greater low speed torque in the driven gear 34 for a given torque in the driving gear 32, recesses such as shown at 62 are provided to impede the rotation of the runners in one direction while producing but little effect in the other direction of rotation.

For normal operation, direct drive, provided by the engagement of jaws 48 with the lugs on gear 46, is used. When extremely high torques are required, gear 45 is shifted into mesh with gear 51. To avoid clashing these gears, a pedal 62' by means of rod 62" is connected to the shaft carrying bell crank 43 and brings the brake 44 into contact with the periphery of gear 31 and retards its movement. Simultaneously therewith rod 42 moves forward closing valve 39 to reduce or eliminate the delivery of fluid from impeller 12 which takes the hydraulic load off pinions 30 thus permitting them to turn freely in the bearings 28 and 29 and eliminate the driving pressures on the teeth of annular gear 31.

Normally the driving pressure on the teeth of gear 31 is reduced by operating the throttle of the engine to which it is attached. By closing the throttle and thus reducing the speed of the engine, the delivery of liquid by the impeller 12 is reduced and runners 21 are thus permitted to rotate on their axes with very little hydraulic resistance, and the driving torque transmitted through gear 31 will be reduced materially or eliminated. By increasing the engine speed, the delivery of liquid from impeller 12 will produce high pressures on the outwardly extending blades of the runners 21 and will hold them from rotating on their own axes or will cause them to rotate forwardly.

To meet various operating conditions the elements of this hydraulic device may be changed to give a wide variety of results. The shape of the blades and the diameter and width of the impeller may be made differently to deliver more liquid at lower pressure or vice versa and the blades of the runners may be made substantially radial or curved oppositely as indicated at 63.

In order that the shifting of the gears may be accomplished automatically, the construction shown in Fig. 5 is provided. In this the arrangement of the gears themselves are substantially the same as in the former figures, but the shifter yoke or fork 54 is replaced by the fork 64 carried by the shaft 65. The planetary gearing controlled by the runners 66 is similar to that shown in Fig. 1, but the two halves 67 and 68 of the rotating carrier are provided with fins or projections 69 and 70 adapted to serve as blades whereby the external portion of this carrier serves as a pumping means for producing pressure in the casing 71 carried between the two members 72 and 73 of the housing. The liquid employed for this pump is that with which the housing is filled.

The liquid under pressure in casing 71 is delivered through the tube 74 to the valve 75 which controls its delivery to the means provided for shifting the shaft 65 and thus the gear 76. As, for a given speed of shaft 77, the rotative speed of the fins 69 and 70 carried by the casing halves 67 and 68, is proportional, at a reduced ratio, to the speed of the annular gear 78, the pressure at valve 75 produced by this rotative speed may be used as a means for determining at what speed of gear 78, gear 76 should be shifted to prevent unnecessarily high or low speeds of gear 78 for variations in the speed of shaft 79 impressed on it by the resistance of the driven load.

With gear 76 held momentarily in neutral position by spring operated plunger 80 engaging the self releasing notch in shaft 65 as shown, pressure in cylinder 81, resulting from opening valve 75, will increase with an increase in the rotative speed of the vanes 69 and 70. As plunger 80 slips out of its notch in shaft 65, gear 76 moves to the right and into direct driving connection with gear 82 by the engagement of the jaw clutch elements incorporated in these gears. Plunger 80 then engages notch 83 in shaft 65 and plunger 84 engages notch 85, the pressure from valve 75 passing through port 85′ into cylinder 86 where it operates piston 87 against the resistance of spring 88.

While gear 76 passes through its neutral positions, the cam 89 engages lever 90 supported to rotate on the pin 91 carried in the cover 92. By the rotation of lever 90, connection 93 engages lever 94 and applies brake 95 to gear 78 to retard the speed of gear 82. Simultaneously therewith connection 96 operates through lever 97 to restrict the flow of liquid through valve 98 and thereby reduce the torque transmitted by runner 66 and the resulting tooth pressures on gear 78. By the application of the brake 95 and the reduction of tooth pressures, the engagement of gear 76 with gear 82 for direct drive and with gear 98 for low speed operation is accomplished without clashing.

When the pressure in pipe 74 is reduced by the retarding of the rotative speeds of the carrier blades 69 and 70, caused by heavy torque loads applied to shaft 79, the pressure in cylinder 81 is reduced and spring 99 causes piston 100 to move to the left when the same reduction in pressure permits plunger 87 to move under the action of spring 88 and release shaft 65. The gear 76 thus automatically moves into engagement with gear 98 and through the gear train provides greater driving torque for shaft 79. As the speed of gear 78 again increases, the increasing pressure in cylinder 81 is transmitted to space 101 through port 102 and the end of plunger 103, which is then in engagement with low speed notch 104, is caused to rise compressing spring 105 and the rod 65 is released and moves to the right under the hydraulic pressure again into direct drive position. As the piston 100 carrying shaft 65 moves from left to right shifting the gear 76, a retarding of the movement to assist in the synchronizing of the gears is provided by the vent space 106 and the port 107. This space which has been drained into compartment 108 while gear 76 was in low speed position, is permitted to refill when the gear passes through neutral, the uncovering of the port 107 allowing the liquid to flow into compartment 106 thus causing a hesitation in the movement of the gear. A syphon type of diaphram 109 closes space 108. The volume of space 107 and the resulting time for synchronizing may be regulated by the adjustable plugs 110 and 111 having a seal 112 to prevent leaks and a cover 113 providing a space 114 above them. This space is drained through tube 115 into the housing 72 and for complete evacuation may be connected to the intake side of the main pump. The gear 76 thus automaticaly shifts forward and backward on the spline shaft 79 for the desired engagements, it being controlled by the rotative speed of the carriers 67 and 68 which are in turn regulated by the resisting torque of the driven shaft 79.

To reverse the drive, gear 76 is shifted from right to left into mesh with an idler (not shown) which is in engagement with gear 116. To prevent an accidental shifting into reverse gear, the plunger 117, which engages the end of shaft 65 to limit its movement, is released by means of bell crank 118 turning on operating shaft 119. The rod 120 engages lever 97 to release the hydraulic drive and to facilitate the shifting of the gears. During the shifting of the gear 76 into reverse position, valve 75 is closed and the pressure in cylinder 81 is relieved so that spring 108 is permitted to move the piston 100 to its extreme position. The lever 121 is provided as a means for emergency control for shifting gear 76 by its end engaging the extension 122 on the shifting fork 64.

Other modes of applying the principle of my invention may be employed instead of the one explained, change being made as regards the mechanism herein disclosed, provided the means stated by any of the following claims or the equivalent of such stated means be employed.

I therefore, particularly point out and distinctly claim as my invention:

1. In a device of the character described, a pumping means, a rotating member serving as a discharge passage for said pumping means, a rotating element adapted to rotate within said rotating member and disposed to restrict the flow of fluid therethrough, and a gear means attached to said rotating element and disposed to control the relative rotation of other gearing engaging therewith.

2. In a device of the character described, a pump impeller attached to a primary shaft, a gear attached to said primary shaft, a rotating member serving as a discharge passage for said pump impeller and turning about the primary shaft as an axis, a planetary element carried by said rotating member, said planetary element serving to restrict the flow of fluid through the rotating member, a gear attached to said planetary element, said last named gear engaging the aforesaid gear attached to the primary shaft and also engaging a gear attached to a secondary shaft, and supporting means adapted to maintain the gears in operating relationship.

3. In a device of the character described, a pump impeller attached to a primary shaft, a gear attached to said primary shaft, a gear attached to a secondary shaft, an intermediate gear disposed to engage the gears on said primary and said secondary shafts, a hydraulic element disposed in a discharge passage from said pump impeller, said hydraulic element being attached to said intermediate gear, and supporting means disposed to maintain the aforesaid gears in operating relationship.

4. In a device of the character described, a pump impeller attached to a primary shaft, a gear attached to said primary shaft, a gear attached to a secondary shaft, an intermediate gear disposed to engage the gears on said primary and said secondary shafts, a hydraulic element disposed in a discharge passage from said pump impeller, said element being attached to said intermediate gear, a supporting means adapted to maintain the aforesaid gears in operating relationship, changeable gearing associated with said secondary shaft, and means whereby pressure from the impeller changes the changeable gearing.

5. In a device of the character described, a pump attached to a primary shaft, a gear attached to said primary shaft, a gear attached to a secondary shaft, an intermediate gear disposed to engage the gears on the said primary and said secondary shafts, a hydraulic element disposed in a discharge passage from said pump, said element being attached to said intermediate gear, supporting means adapted to maintain the aforesaid gears in operating relationship, and means for controlling a discharge of fluid from said pump.

6. In a device of the character described, a pump attached to a primary shaft, a gear attached to said primary shaft, a gear attached to a secondary shaft, an intermediate gear disposed to engage the gears attached to said primary and said secondary shafts, a hydraulic element disposed in a passage from said pump, said element being attached to said intermediate gear, supporting means adapted to maintain the aforesaid gears in operating relationship, and braking means associated with said secondary shaft.

7. In a device of the character described, a gear attached to a primary shaft, a gear attached to a secondary shaft, an intermediate gear disposed to engage the gears attached to the said primary and said secondary shafts, a blade impeller for controlling said intermediate gear, supporting means adapted to maintain the aforesaid gears in operating relationship, and centrifugal pumping means attached to the primary shaft delivering fluid to a guide passage, the guide passage being formed to direct the fluid substantially tangentially into the impeller.

8. In a device of the character described, a casing, liquid in said casing, a centrifugal pump for maintaining a part of said liquid under pressure, a driving gear, a driven gear, an intermediate gear, means whereby said liquid under pressure controls said intermediate gear, changeable gearing driven by said driven gear, and hydraulic means for progressively changing said gearing, said hydraulic means being actuated by liquid under pressure, the liquid under pressure being supplied from an enclosure for the aforesaid centrifugal pump.

9. In a device of the character described, a casing, liquid within said casing, a centrifugal pump for maintaining a part of said liquid under pressure, planetary gearing comprising a driving gear, a driven gear, and an intermediate gear, means whereby said liquid under pressure controls said intermediate gear, changeable gearing driven by said driven gear, and means for changing said changeable gearing, said last named means comprising a fluid operated lock for holding said gearing in a meshing position, the fluid being delivered under pressure by a member being rotated by the aforesaid planetary gearing.

10. In a device of the character described, a casing, liquid within said casing, a pump for maintaining a part of said liquid under pressure, a driving gear, a driven gear, an intermediate gear, moving blade means whereby said liquid under pressure controls said intermediate gear, a sealing space surrounding a portion of said pump, and means for maintaining a quantity of liquid in said space.

11. In a device of the character described, a casing, liquid within said casing, a pump for maintaining a part of said liquid under pressure, a driving gear, a driven gear, an intermediate gear, means whereby said liquid under pressure controls said intermediate gear, changeable gearing driven by said driven gear, and synchronizing means for controlling a changing of said changeable gearing, said last named means comprising two pressure chambers, one of the chambers being an enclosed space extending around a part of the aforesaid casing.

12. In a device of the character described, a casing, liquid within said casing, pumping means for maintaining a part of said liquid under pressure, gearing adapted to be controlled by an impeller, other gearing driven by the aforesaid gearing, means for moving one element of the last named gearing relative to another element, said means comprising a pressure operated member connected with one of the said elements, and a passage between the aforesaid casing and a chamber for the pressure operated member.

13. In a device of the character described, a pumping means, a rotating member serving as a discharge passage for said pumping means, a rotating element adapted to rotate within said rotating member and disposed to restrict a flow of fluid therethrough, gear means attached to said rotating element and disposed to control relative rotation of other gearing engaging therewith, and a collecting chamber surrounding a part of an inlet passage of the pumping means.

14. In a device of the character described, pumping means, a rotating member serving as a discharge passage for said pumping means, a rotating element adapted to rotate within said rotating member and disposed to restrict a flow of fluid therethrough, gear means attached to said rotating element and disposed to control relative rotation of other gearing engaging therewith, and means adapted to retard a flow of fluid past a port of the rotating element.

15. In a device of the character described, a rotatable casing, a fixed casing, liquid within said casings, a centrifugal pump maintaining the liquid in the rotatable casing under pressure, pumping means maintaining liquid under pressure in a part of the fixed casing, a driving gear, a driven gear, an intermediate gear, means whereby said liquid under pressure in the rotatable casing controls said intermediate gear, changeable gearing driven by said driven gear, and means for changing said changeable gearing, said last named means comprising a member actuated by pressure of liquid from the fixed casing.

16. In a transmission device having changeable gearing and members cooperating to serve as a clutch to connect said gearing to a driving member, one of said members having means for providing fluid under pressure, a moveable element for changing the gearing, means for causing the moveable element to be actuated upon a change in pressure of the fluid, and valve means regulating the delivery of fluid from the aforesaid member having means for providing fluid under pressure whereby the relative speed of members of the gearing is changed.

17. In a device of the character described, a casing, changeable gearing in the casing, a driving member and a driven member, a controlled member serving as means to clutch the driving member to the driven member, pumping means controlled by a relative rate of movement of the driving and driven members to produce a variable fluid pressure, and means for changing the changeable gearing, said means being actuated by the variable fluid pressure.

18. In a device of the character described, a casing, changeable gearing in the casing, a driving member and a driven member, a member serving as means to clutch the driving member to the driven member, pumping means controlled by a relative rate of movement of the driving and driven members to produce a variable fluid pressure, means for changing the changeable gearing, said means being actuated by the variable fluid pressure, and means for retarding a movement of one of the aforesaid members to synchronize the changeable gearing.

19. In a device of the character described a casing, changeable gearing in the casing, a driving member and a driven member, a fluid controlled member serving as means to clutch the driving member to the driven member, pumping means controlled by a relative rate of movement of the driving and driven members to produce a variable fluid pressure, means for changing the changeable gearing, said means being actuated by the variable fluid pressure, and means for changing the relative movement of the driving and driven members to synchronize the changeable gearing, the last said means comprising a valve controlling a flow of fluid to the aforesaid fluid controlled member.

20. In a device of the character described, a casing, changeable gearing in the casing, a driving member and a driven member, a controlled member serving as means to clutch the driving member to the driven member, pumping means controlled by a relative rate of movement of the driving and driven members to produce a variable fluid pressure, and means for changing the changeable gearing, said means being actuated by the variable fluid pressure, and adjustable means for regulating a flow of the fluid under variable pressure.

21. In a device of the character described, a casing, changeable gearing in the casing, a driving member and a driven member, a controlled member serving as means to clutch the driving member to the driven member, pumping means controlled by a relative rate of movement of the driving and driven members to produce a variable fluid pressure, and means for changing the changeable gearing, said means being actuated by the variable fluid pressure, and means actuated by the fluid under variable pressure for controlling the time of change of the changeable gearing.

22. In a device of the character described, a casing, changeable gearing in the casing, a driving member and a driven member, a controlled member serving as means to clutch the driving member to the driven member, pumping means controlled by a relative rate of movement of the driving and driven members to produce a variable fluid pressure, and means for changing the changeable gearing, said means being actuated by the variable fluid pressure, and collecting means preventing a loss of fluid by leakage of the fluid under the variable pressure.

23. In a device of the character described, a casing, changeable gearing in the casing, a driving member and a driven member, a controlled member serving as means to clutch the driving member to the driven member, pumping means controlled by a relative rate of movement of the driving and driven members to produce a variable fluid pressure, and means for changing the changeable gearing, said means being actuated by the variable fluid pressure, and pedal operated means controlling a movement of one of the aforesaid members.

24. In a device of the character described, a casing, changeable gearing in the casing, a driving member and a driven member, a controlled member serving as means to clutch the driving member to the driven member, pumping means controlled by a relative rate of movement of the driving and driven members to produce a variable fluid pressure, and means for changing the changeable gearing, said means being actuated by the variable fluid pressure, and valve means regulating a flow of fluid to control the aforesaid controlled member for changing the relative speeds of the driving and driven members.

25. In a device of the character described, a casing, a driving member, a driven member, means clutching said driving member and driven member together, the clutching means comprising pumping means to provide fluid under pressure, changeable gearing driven by the driven member, means for moving one element of the changeable gearing relative to another element, said means comprising a member operated by the fluid under pressure, and a notched bar connecting the fluid operated member to an element of the changeable gearing.

26. In a device of the character described, a casing, a driving member, a driven member, means clutching said driving member and driven member together, the clutching means comprising pumping means to provide fluid under pressure, changeable gearing driven by the driven member, means for moving one element of the gearing relative to another element, said means comprising a member operated by the fluid under pressure, means connecting the said last named member to the means for moving one element of the gearing, and a fluid operated lock holding the connecting means.

27. In a device of the character described, a casing, changeable gearing in the casing, a control chamber for the changeable gearing, members geared together and serving as a clutch in the casing, a pressure fluid controlled member for regulating relative movement of the members serving as a clutch, pumping means comprising members constrained to rotate when the clutch members rotate for delivering streams of fluid under pressure, a channel for delivering one of said streams to a member controlling relative movement of the clutch members, and a channel for delivering another of said streams to the control chamber.

COURTNEY N. MITCHELL.